(12) United States Patent
Sano et al.

(10) Patent No.: US 10,908,380 B2
(45) Date of Patent: Feb. 2, 2021

(54) INCLINATION ADJUSTING MECHANISM

(71) Applicant: Mitutoyo Corporation, Kawasaki (JP)

(72) Inventors: Hidekazu Sano, Kawasaki (JP); Kenji Okabe, Kawasaki (JP)

(73) Assignee: MITUTOYO CORPORATION, Kawasaki (JP)

( * ) Notice: Subject to any disclaimer, the term of this patent is extended or adjusted under 35 U.S.C. 154(b) by 128 days.

(21) Appl. No.: 16/159,976

(22) Filed: Oct. 15, 2018

(65) Prior Publication Data

US 2019/0146176 A1     May 16, 2019

(30) Foreign Application Priority Data

Nov. 10, 2017  (JP) ................... 2017-217009

(51) Int. Cl.
G02B 7/02       (2006.01)

(52) U.S. Cl.
CPC ............. *G02B 7/023* (2013.01); *G02B 7/021* (2013.01)

(58) Field of Classification Search
CPC ........ G02B 7/023; G02B 7/021; G02B 7/025; G02B 7/003; G02B 7/02; G02B 7/022; G02B 7/026; G02B 7/00; G02B 21/26; G02B 21/36; G02B 21/242; G02B 23/2476; G02B 27/62
USPC ................................. 359/811, 819, 822, 823
See application file for complete search history.

(56) References Cited

FOREIGN PATENT DOCUMENTS

JP     2013-122485      6/2013

*Primary Examiner* — Mahidere S Sahle
(74) *Attorney, Agent, or Firm* — Rankin, Hill & Clark LLP (57) ABSTRACT

An inclination adjusting mechanism includes a first member that is attachable to a connection portion of a lens unit that is connectable to a lens barrel; a second member that faces the first member and that is attachable to a connection portion of the lens barrel that is connectable to the lens unit; contact members that are fixed to the first member, that protrude from the first member toward the second member, and that contact the second member; and adjusting/fixing members that are capable of adjusting an inclination of the first member relative to the second member and capable of fixing the first member to the second member. The second member has an inclined surface that the contact members contact, and each of the contact members has a curved surface that contacts the inclined surface.

19 Claims, 6 Drawing Sheets

INCLINATION ADJUSTING MECHANISM

CROSS REFERENCES TO RELATED APPLICATIONS

The present invention contains subject matter related to Japanese Patent Application No. 2017-217009 filed in the Japan Patent Office on Nov. 10, 2017, the entire contents of which are incorporated herein by reference.

BACKGROUND OF THE INVENTION

1. Field of the Invention

The present invention relates to an inclination adjusting mechanism that is capable of adjusting the inclination of, for example, a lens unit relative to a lens barrel.

2. Description of the Related Art

For example, in a microscope or an optical measurement apparatus, such as an image measurement apparatus, there is a case where it is desirable to adjust the inclination of a lens unit relative to a lens barrel. In such a case, for example, it is possible to adjust the inclination by providing a plurality of adjustment screws and fixing screws to a member attached to the lens unit or to a member attached to the lens barrel, and by using the adjustment screws and the fixing screws (Japanese Unexamined Patent Application Publication No. 2013-122465).

When adjusting the inclination of a lens by using a plurality of adjustment screws, it is necessary to repeatedly adjust the heights of the plurality of adjustment screws while checking the inclination of the lens. However, the direction of the inclination of the lens differs between the adjustment screws, and the supporting point of the inclination of the lens is not fixed. Thus, there is a problem in that it is difficult to predict that the inclination of the lens can be adjusted to a desirable direction by adjusting the height of which of the screws to what, degree and it is not easy to perform the adjustment.

SUMMARY OF THE INVENTION

The present invention has been made against such a background, and an object thereof is to provide an inclination adjusting mechanism that is capable of easily adjusting the inclination of, for example, a lens unit relative to a lens barrel.

According to an embodiment of the present invention, an inclination adjusting mechanism, which is capable of adjusting an inclination of a lens unit relative to a lens barrel, includes a first member that is attachable to a connection portion of the lens unit, the connection portion being connectable to the lens barrel; a second member that faces the first member and that is attachable to a connection portion of the lens barrel, the connection portion being connectable to the lens unit; a plurality of contact members that are fixed to the first member, that protrude from the first member toward the second member, and that contact the second member; and a plurality of adjusting/fixing members that are capable of adjusting an inclination of the first member relative to the second member and capable of fixing the first member to the second member. The second member has an inclined surface that the contact members contact, and each of the contact members has a curved surface that contacts the inclined surface.

According to another embodiment of the present invention, an inclination adjusting mechanism, which is capable of adjusting an inclination of a lens unit relative to a lens barrel, includes a first member that is attachable to a connection portion of the lens unit, the connection portion being connectable to the lens barrel; a second member that faces the first member and that is attachable to a connection portion of the lens barrel, the connection portion being connectable to the lens unit; a plurality of contact members that are fixed to the second member, that protrude from the second member toward the first member, and that contact the first member; and a plurality of adjusting/fixing members that are capable of adjusting an inclination of the first member relative to the second member and capable of fixing the first member to the second member. The first member has an inclined surface that the contact members contact, and each of the contact members has a curved surface that contacts the inclined surface.

The lens barrel may have a first internal thread, and the lens unit may have a first external thread that is screwable into the first internal thread. The first member may have s second internal thread that is screwable onto the first external thread, and the first member may be attachable to and removable from the lens unit via the second internal thread. The second member may have a second external thread that is screwable into the first internal thread, and the second member may be attachable to and removable from the lens barrel via the second external thread.

The inclined surface that the contact members contact may be a conical surface that has a vertex on a reference axis of the lens barrel or an optical axis of the lens unit or a spherical surface that has a center on the reference axis or the optical axis.

The number of the plurality of contact members may be three. The three contact members may be disposed at regular intervals in a circumferential direction centered on a reference axis of the lens barrel or an optical axis of the lens unit.

The number of the plurality of adjusting/fixing members may be three. The three adjusting/fixing members may be disposed at regular intervals in a circumferential direction centered on the reference axis of the lens barrel or the optical axis of the lens unit. Each of the three adjusting/fixing members may be disposed outside in a radial direction relative to a corresponding one of the contact members.

The first member may have through-holes into which the adjusting/fixing members are inserted. The second member may have internal threads in portions thereof corresponding to the through-holes of the first member, the internal threads allowing the adjusting/fixing members to be screwed thereinto. The adjusting/fixing members may be screws each of which has an outside diameter smaller than an inside diameter of a corresponding one of the through-holes of the first member and that are screwable into the internal threads.

According to an embodiment of the present invention, an inclination adjusting mechanism includes a first member; a second member that faces the first member; a plurality of contact members that are fixed to one of the first and second members, that protrude from the one of the first and second members toward the other of the first and second members, and that contact the other of the first and second members; and a plurality of adjusting/fixing members that are capable of adjusting an inclination of the one of the first and second members relative to the other of the first and second members and capable of fixing the one of the first and second members to the other of the first and second members. The other of the first and second members has an inclined surface that the contact members contact, and each of the contact members has a curved surface that contacts the inclined surface.

With the present invention, it is possible to provide an inclination adjusting mechanism that can easily adjust the inclination of a lens.

DESCRIPTION OF THE PREFERRED EMBODIMENTS

First Embodiment

Figure 2:
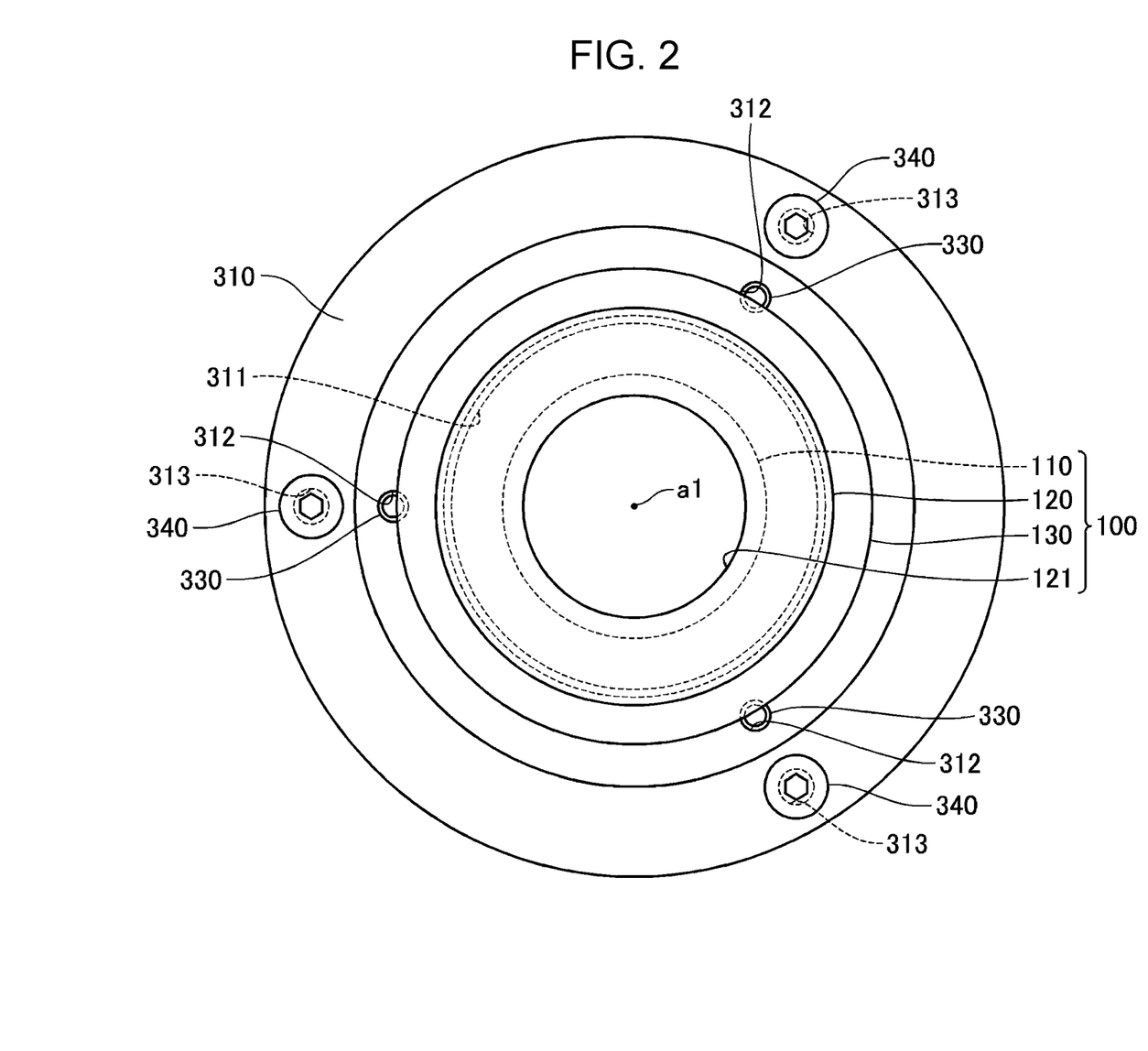
FIG. 2 is a bottom view of the lens inclination adjusting mechanism.
Figure 3:
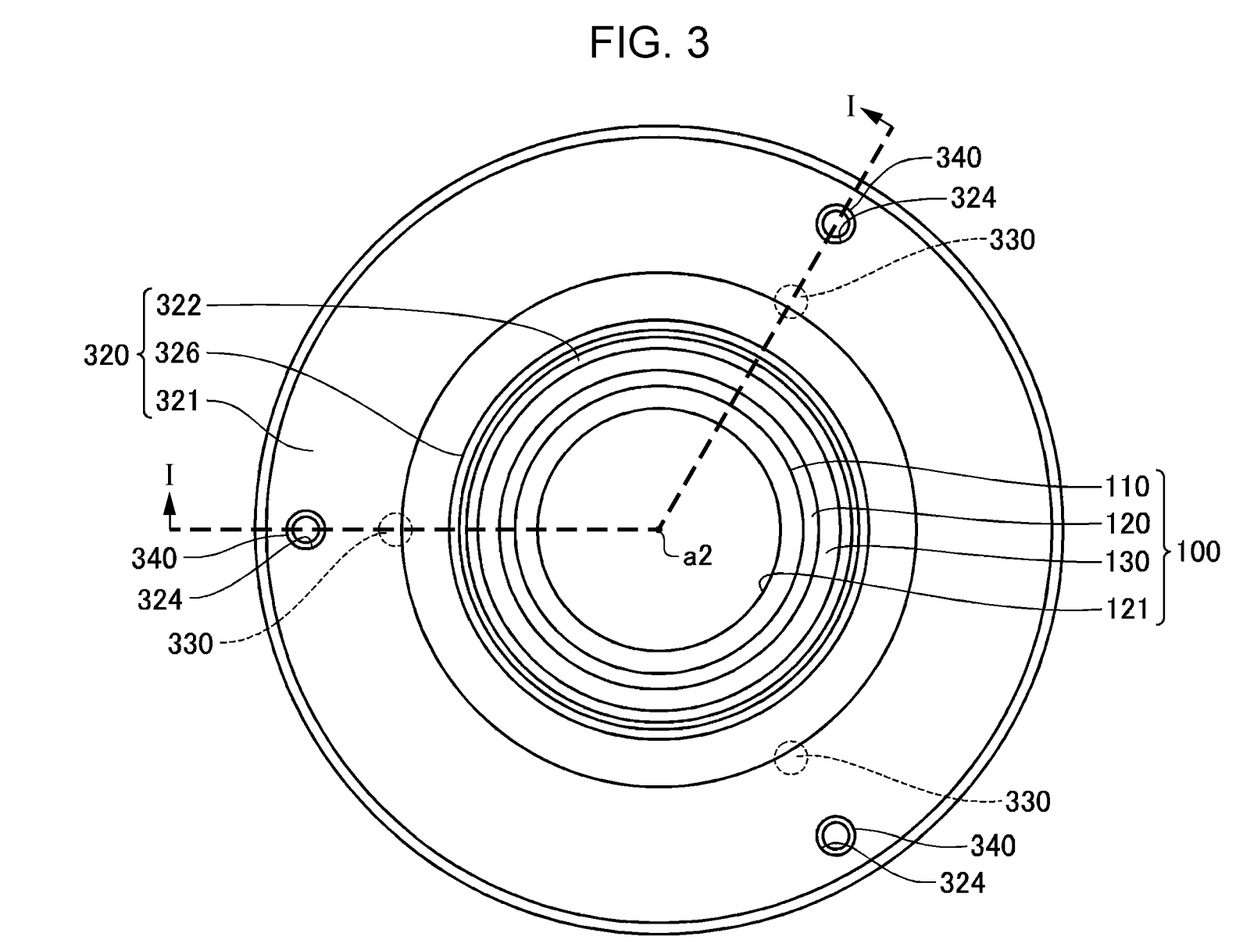
FIG. 3 is a plan view of the lens inclination adjusting mechanism.

Next, referring to FIGS. 1 to 3, a first embodiment of the present invention will be described. An inclination adjusting mechanism according to the first embodiment is an inclination adjusting unit 300, which is attachable to and removable from an objective lens unit 100 and a lens barrel 200. It is possible to directly attach the objective lens unit 100 to the lens barrel 200 by screwing an external thread 134 (first external thread) into an internal thread 201 (first internal thread) of the lens barrel 200. However, in the first embodiment, the inclination adjusting unit 300 has an external thread 326 (second external thread) and an internal thread 311 (second internal thread), which are respectively interchangeable with the external thread 134 and the internal thread 201; and the objective lens unit 100 is attached to the lens barrel 200 via the inclination adjusting unit 300.

The objective lens unit 100 includes two objective lenses 110 that are arranged in the direction of an optical axis a1, two holding members 120 that respectively hold the objective lenses 110, and a cover 130 that accommodates the objective lenses 110 and the holding members 120. The objective lenses 110 are each, for example, a substantially disc-shaped convex lens. As illustrated in FIG. 2, each of the holding members 120 has, for example, a substantially annular shape having an opening 121 in a central part thereof and holds an outer peripheral part of a corresponding one of the objective lenses 110. As illustrated in FIG. 1, the cover 130 includes an accommodation portion 131 and a connection portion 132, each of which has a substantially cylindrical shape centered on the optical axis a1. The accommodation portion 131 accommodates the objective lenses 110 and the holding members 120. The connection portion 132 protrudes from the accommodation portion 131 toward the lens barrel 200 in the direction of the optical axis a1. The external thread 134 is formed on an outer peripheral surface of the connection portion 132.

The lens barrel 200 is, for example, a lens barrel of a microscope or an image measurement apparatus. The lens barrel 200 has, for example, a substantially cylindrical shape centered on a reference axis a2. The internal thread 201 is formed on an inner peripheral surface of an end portion of the lens barrel 200.

The inclination adjusting unit 300 is capable of adjusting the inclination of the objective lens unit 100 relative to the lens barrel 200. The inclination adjusting unit 300 includes a first member 310, a second member 320, a plurality of contact members 330, and a plurality of adjusting/fixing members 340. The first member 310 is attachable to a connection portion (the external thread 134) of the objective lens unit 100, the connection portion being connectable to the lens barrel 200. The second member 320 faces the first member 310 and is attachable to a connection portion (the internal thread 201) of the lens barrel 200, the connection portion being connectable to the objective lens unit 100. The contact members 330 are fixed to the first member 310, protrude from the first member 310 toward the second member 320, and contact the second member 320. The adjusting/fixing members 340 are capable of adjusting the inclination of the first member 310 relative to the second member 320 and capable of fixing the first member 310 to the second member 320.

The first member 310 has, for example, a substantially annular shape having an opening in a central part thereof. The internal thread 311, which is screwable onto the external thread 134 of the objective lens unit 100, is formed on an inner peripheral surface of the opening. The first member 310 is attachable to and removable from the objective lens unit 100 via the internal thread 311. A surface of the first member 310 on the objective lens unit 100 side contacts the cover 130 of the objective lens unit 100, and thereby the positional relationship between the first member 310 and the objective lens unit 100 is fixed. The first member 310 has through-holes 312 into which the contact members 330 are inserted, and through-holes 313 into which the adjusting/fixing members 340 are inserted. As illustrated in FIG. 2, the through-holes 312 and the through-holes 313 are formed at regular intervals of 120° in the circumferential direction centered or the optical axis a1. Each of the through-holes 313 is disposed outside in the radial direction from the optical axis a1 relative to a corresponding one of the through-holes 312.

Figure 1:
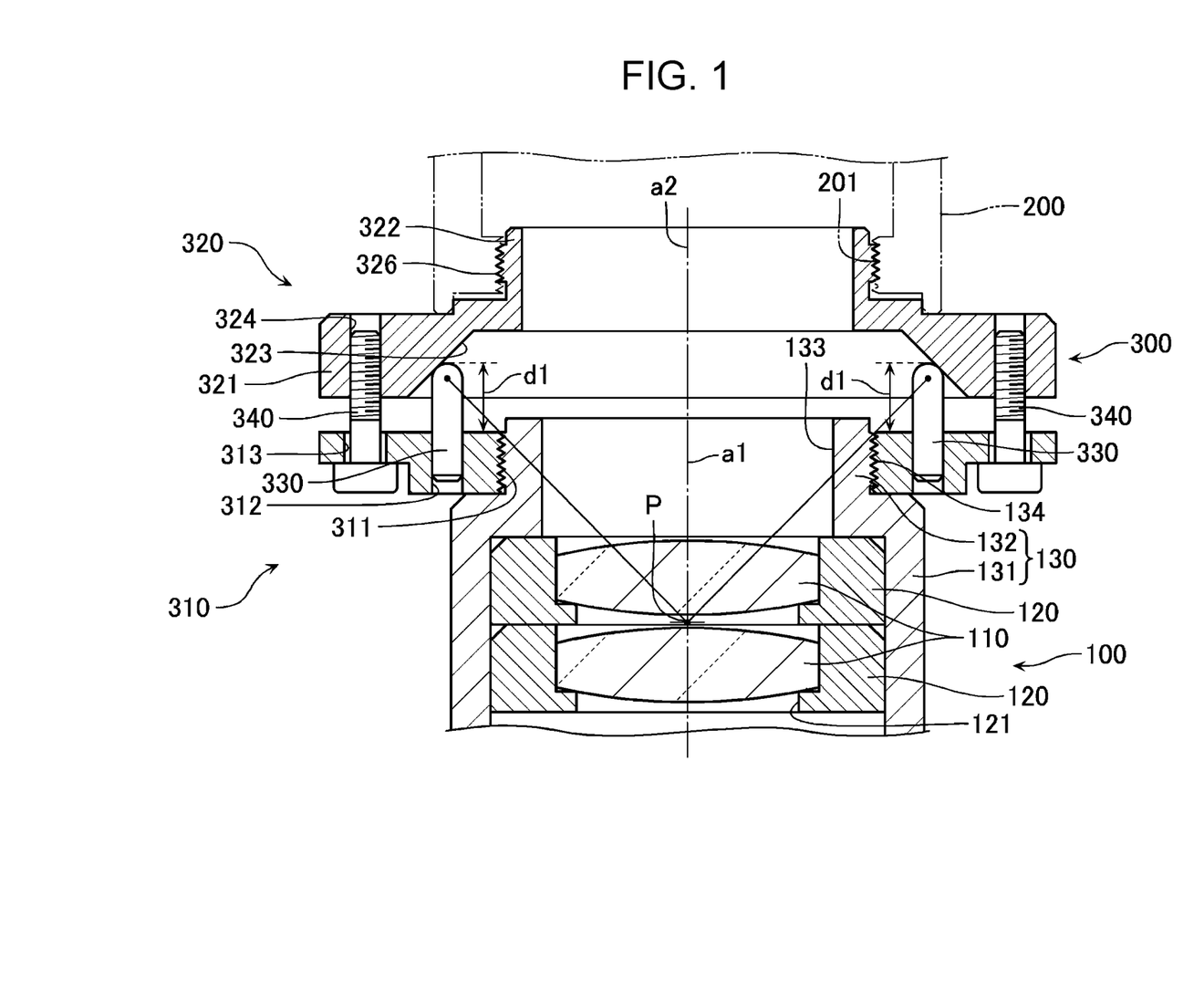
FIG. 1 is a sectional view of a lens inclination adjusting mechanism according to a first embodiment of the present invention.

As illustrated in FIG. 1, the second member 320 includes a substantially annular flange portion 321 and a connection portion 322, which protrudes from the flange portion 321 toward the lens barrel 200 in the direction of the reference axis a2. In a surface of the flange portion 321 on the objective lens unit 100 side, a conical inclined surface 323, which the contact members 330 contact, is formed. The inside diameter of the inclined surface 323 decreases toward the lens barrel 200 and increases toward the objective lens unit 100. The inclined surface 323 may be a conical surface having the vertex on the reference axis a2 or may be a spherical surface having the center on the reference axis a2. The flange portion 321 is thicker than the first member 310. This is because the flange portion 321 has the inclined surface 323. Internal threads 324, into which the adjusting/fixing members 340 are screwed, are formed in the flange portion 321. The internal threads 324 are formed at positions corresponding to the through-holes 313 of the first member 310. That is, as illustrated in FIG. 3, the internal threads 324 are formed at regular intervals of 120° in the circumferential direction centered on the reference axis a2. The connection portion 322 has a substantially cylindrical shape centered on the reference axis a2. As illustrated in FIG. 1, the external thread 326, which is screwable into the internal thread 201 of the lens barrel 200, is formed on an outer peripheral surface of the connection portion 322. The second member 320 is attachable to and removable from the lens barrel 200 via the external thread 326.

The contact members 330 are, for example, pins that are inserted into the through-holes 312 of the first member 310 and fixed to the first member 310 by using adhesive or the like. The contact members 330 protrude toward the second member 320 in the direction of the optical axis a1 and contact the inclined surface 323 of the second member 320. Contact portions the contact members 330, which contact the inclined surface 323, are curved surfaces such as spherical surfaces. As illustrated in FIG. 2, the inclination adjusting unit 300 includes three contact members 330. As illustrated in FIG. 1, the three contact members 330 protrude from the first member 310 by the same length d1.

The adjusting/fixing members 340 are, for example, screws that are inserted into the through-holes 313 of the first member 310 and screwed into the internal threads 324 of the second member 320. The outside diameter of the adjusting/fixing members 340 is smaller than the inside diameter of the through-holes 313 of the first member 310. For example, coil springs may be disposed between the first member 310 and the second member 320, and the adjusting/fixing members 340 may be inserted into the coil springs.

Figure 4:
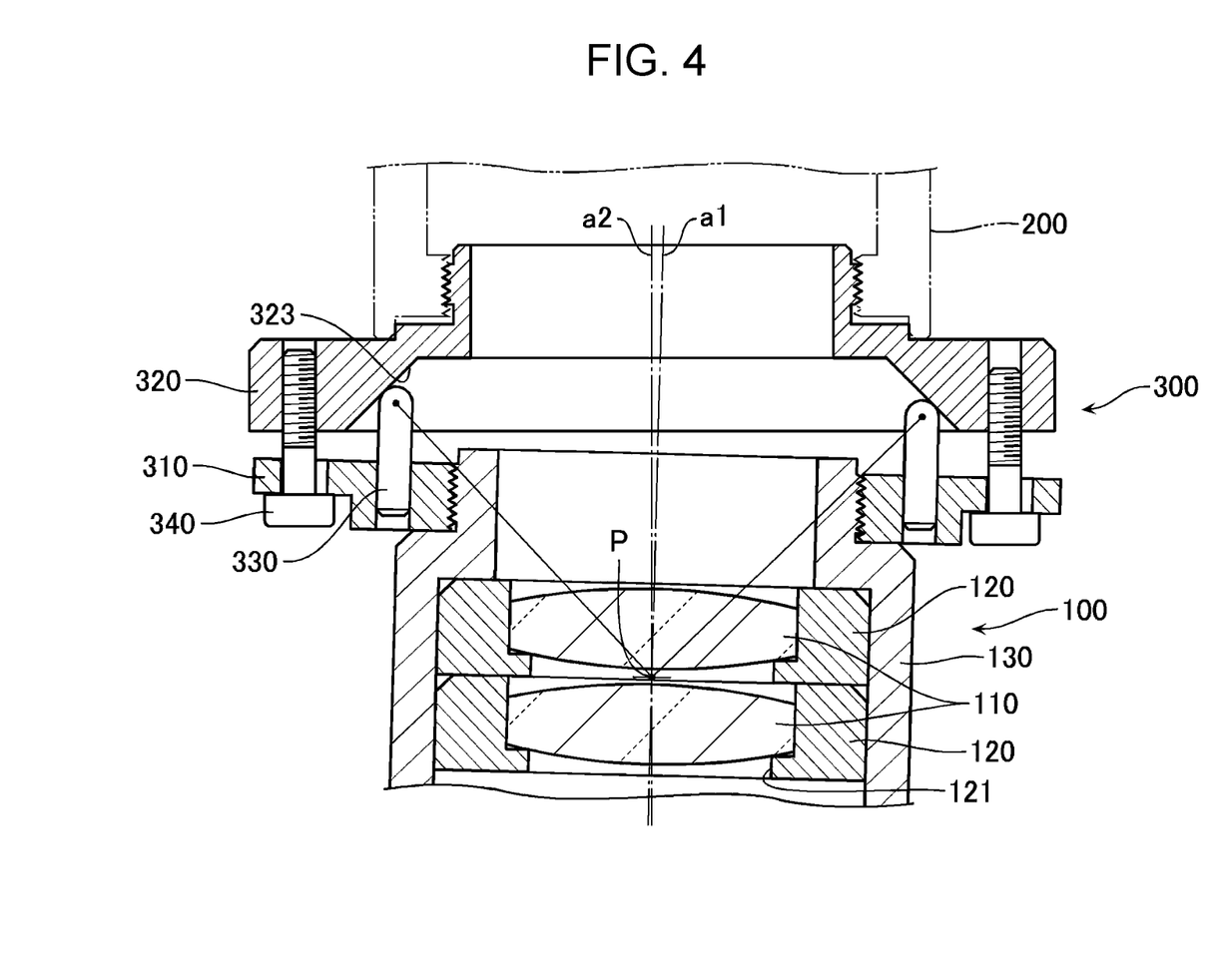
FIG. 4 is schematic sectional view illustrating a method of using the lens inclination adjusting mechanism.

Next, referring to FIG. 4, a method of using the inclination adjusting unit 300 will be described. When performing inclination adjustment, for example, one of the adjusting/fixing members 340 (screws) is loosened, and, at the same time, another of the adjusting/fixing members 340 is fastened. Thus, in a state in which the contact member 330 adjacent to the remaining adjusting/fixing member 340 is in contact with the inclined surface 323, the contact members 330 adjacent to the adjusted portions slide along the inclined surface 323 of the second member 320. Thus, the optical axis a1 of the objective lenses 110 becomes inclined in the direction from the loosened adjusting/fixing member 340 side toward the fastened adjusting/fixing member 340 side. In a case where the inclined surface 323 is a spherical surface or a conical surface that can be regarded as a spherical surface, the point of intersection of the normal lines extending from points of contact between the inclined surface 323 and the contact members 330 exists on the optical axis a1. With this point as a supporting point p, the objective lens unit 100, the first member 310, and the contact members 330 become inclined together.

By repeating the adjustment as necessary, it is possible to adjust the inclination of the objective lens unit 100 relative to the lens barrel 200.

Next, advantageous effects of the first embodiment will be described. As described above, in a microscope or an optical measurement apparatus, such as an image measurement apparatus, there is a case where it is desirable to adjust the inclination of a lens unit relative to a lens barrel. However, for example, with an existing method of simply adjusting the heights of adjustment screws repeatedly, the supporting point of the inclination of the lens is not fixed. Thus, the existing method has a problem in that it is difficult to predict that the inclination of the lens can be adjusted to a desirable direction by adjusting the height of which of the screws to what degree and it is not easy to perform the adjustment.

In contrast, with the first embodiment, it is possible to fix the supporting point of the inclination of the objective lenses 110 substantially to the supporting point P on the optical axis a1 of the objective lenses 110. Therefore, it is easy to predict the direction in which the objective lenses 110 become inclined. Accordingly, it is easy to adjust the inclination of the objective lenses 110. Moreover, with the structure according to the first, embodiment, it is possible to adjust the position of the supporting point P to a desirable position by adjusting the inclination angle or the like of the inclined surface 323.

Second Embodiment

Figure 5:
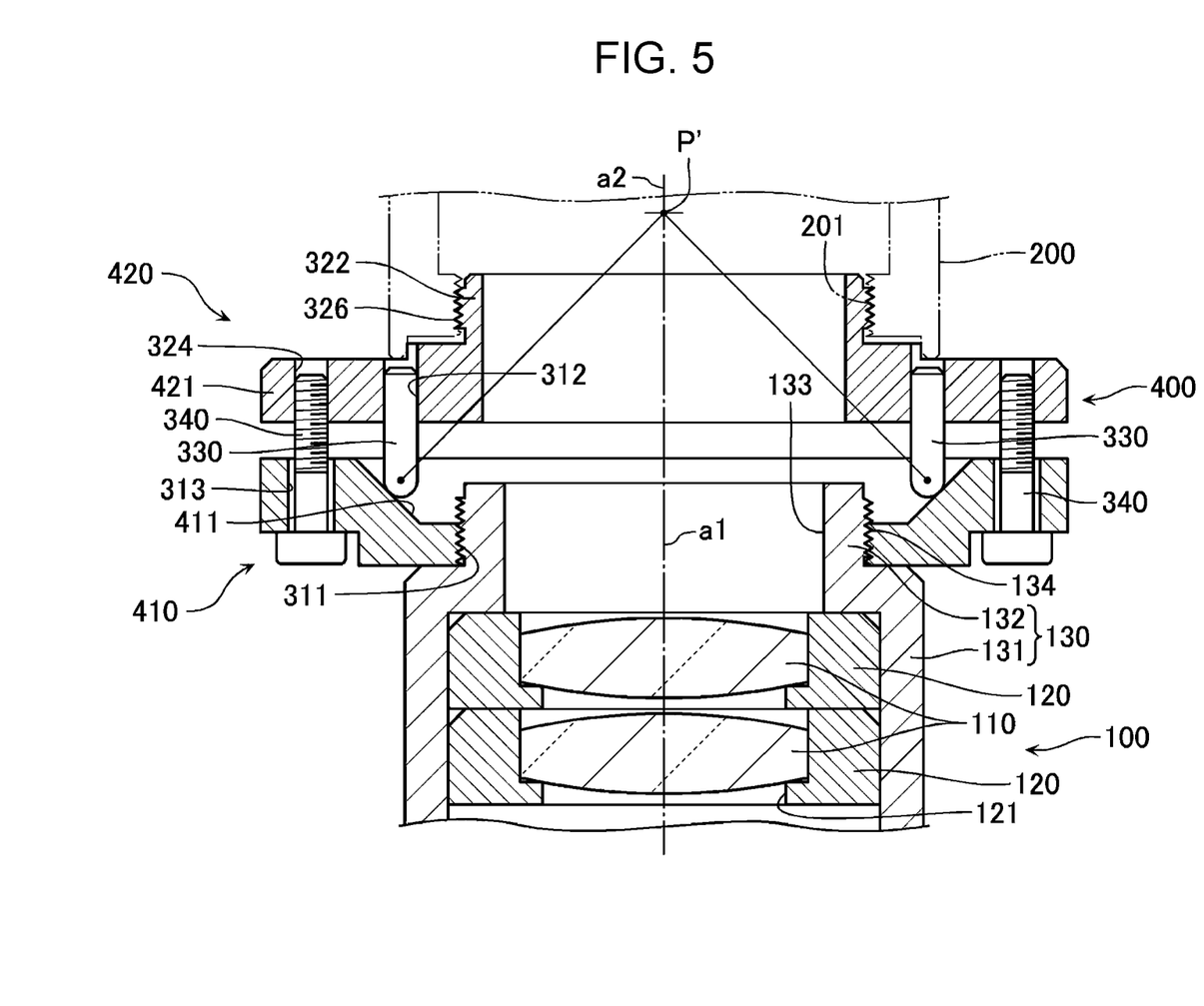
FIG. 5 is a sectional view of a lens inclination adjusting mechanism according to a second embodiment of the present invention.

Next, referring to FIG. 5, a second embodiment of the present invention will be described. A lens inclination adjusting mechanism according to the second embodiment is an inclination adjusting unit 400. In the following description, elements of the second embodiment that are the same as those of the first embodiment will be denoted by the same numerals, and descriptions of such elements will be omitted.

Basically, the structure of the inclination adjusting unit 400 is similar to that of the inclination adjusting unit 300 according to the first embodiment. However, the inclination adjusting unit 400 differs from the inclination adjusting unit 300 in that the contact members 330 are fixed not to the first member 310 but to a second member 420 and in that an inclined surface 411 that contacts the contact members 330 is formed not in the second member 320 but in a first member 410.

The inclined surface 411 is a conical inclined surface formed in a surface of the first member 410 on the lens barrel 200 side. The inside diameter of the inclined surface 411 increases toward the lens barrel 200 and decreases toward the objective lens unit 100. The inclined surface 411 may be a conical surface having the vertex on the optical axis a1 or may be a spherical surface having the center on the optical axis a1. In the second embodiment, because the inclined surface 411 is formed not in the second member 320 but in the first member 410, the first member 410 is thicker than a flange portion 421 of the second member 420.

Next, advantageous effects of the second embodiment will be described. With the second embodiment, it is possible to fix the supporting point of the inclination of the objective lenses 110 not to the supporting point P on the optical axis a1 of the objective lenses 110 (see FIG. 1) but substantially to a supporting point P' on the reference axis a2 of the lens barrel 200. Also with such a configuration, it is easy to predict the direction in which the objective lenses 110 become inclined, and it is easy to adjust the inclination of the objective lenses 110. Moreover, it is possible to adjust the position of the supporting point P' to a desirable position by adjusting the inclination angle or the like of the inclined surface 411.

Third Embodiment

Figure 6:
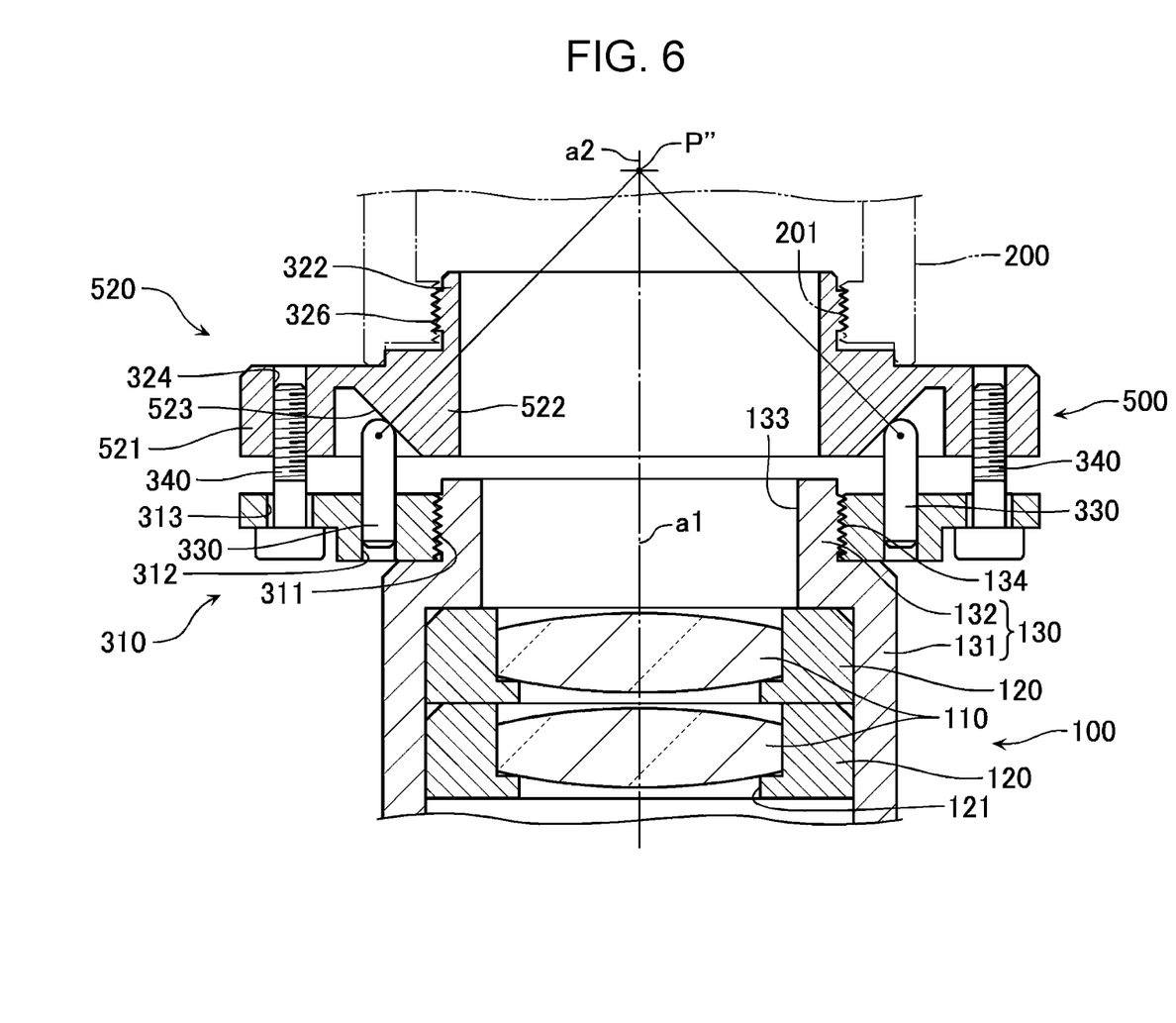
FIG. 6 is a sectional view of a lens inclination adjusting mechanism according to a third embodiment of the present invention.

Next, referring to FIG. 6, a third embodiment of the present invention will be described. A lens inclination adjusting mechanism according to the third embodiment is an inclination adjusting unit 500. In the following description, elements of the third embodiment that are the same as those of the first embodiment will be denoted by the same numerals, and descriptions of such elements will be omitted.

Basically, the structure of the inclination adjusting unit 500 is similar to that of the inclination adjusting unit 300 according to the first embodiment. However, the inclination adjusting unit 500 differs from the inclination adjusting unit 300 in the configuration of an inclined surface 523 that contacts the contact members 330. In the third embodiment, a frusto-conical protruding portion 522, which protrudes toward the objective lens unit 100, is formed on a surface of a flange portion 521 of a second member 520 on the objective lens unit 100 side, and an outer peripheral surface of the protruding portion 522 is the inclined surface 523. The outside diameter of the inclined surface 523 increases toward the lens barrel 200 and decreases toward the objective lens unit 100. The inclined surface 523 may be a conical surface having the vertex on the reference axis a2 or may be a spherical surface having the center on the reference axis a2.

Next, advantageous effects of the third embodiment will be described. Also with the third embodiment, in the same way as with the second embodiment, it is possible to fix the supporting point of the inclination of the objective lenses 110 substantially to a supporting point P'' on the reference axis a2 of the lens barrel 200. Accordingly, it is easy to predict the direction in which the objective lenses 110 become inclined, and it is easy to adjust the inclination of the objective lenses 110. Moreover, it is possible to adjust the position of the supporting point P'' to a desirable position by adjusting the inclination angle or the like of the inclined surface 523.

In the third embodiment, in the same way as in the first embodiment, the contact members 330 are fixed to the first member 310, and the inclined surface 523 is formed in the second member 520. However, in the same way as in the second embodiment, the contact members 330 may be fixed to the second member, a frusto-conical protruding portion protruding toward the lens barrel 200 may be formed on a surface of the first member 310 on the lens barrel 200 side, and an outer peripheral surface of the protruding portion may be an inclined surface. The outside diameter of the inclined surface decreases toward the lens barrel 200 and increases toward the objective lens unit 100. Also with such a configuration, in the same way as with the first embodiment, it is possible to fix the supporting point of the inclination of the objective lenses 110 substantially to a point on the optical axis a1 of the objective lenses 110.

Other Embodiments

Heretofore, lens inclination adjusting mechanisms according to first to third embodiments of the present invention have been described. However, the first to third embodiments are examples, and the configurations or the like of these embodiments may be modified as appropriate.

For example, the lens inclination adjusting mechanisms according to first to third embodiments are the inclination adjusting units 300, 400, and 500, which are attachable to and removable from the objective lens unit 100 and the lens barrel 200. However, in an inclination adjusting mechanism according the present invention, the first member 310 may be a part of the objective lens unit 100 and/or the second member 320 may be a part of the lens barrel 200. An inclination adjusting mechanism according to the present invention is capable of adjusting not only the inclination of a lens relative to a lens barrel but also the inclination of another optical element, such as a prism, a mirror, or an imaging element relative to the lens barrel. Moreover, the inclination adjusting mechanism can adjust the inclination of a lens or another optical element relative to an object other than a lens barrel, such as the body of an optical device.

In the first to third embodiments, the contact members 330 are pins that extend in the direction of the optical axis a1 or in the direction of the reference axis a2. However, contact members in the present invention need not extend in the direction of the optical axis a1 or in the direction of the reference axis a2, and may be inclined relative to the direction of the optical axis a1 or the direction of the reference axis a2. As long as the contact portions of the contact members 330, which contact the inclined surface, are curved surfaces such as spherical surfaces, the contact members 330 may be members that are not pins, such as balls.

What is claimed is:

1. An inclination adjusting mechanism that is capable of adjusting an inclination of a lens unit relative to a lens barrel, the inclination adjusting mechanism comprising:
    a first member that is attachable to a connection portion of the lens unit, the connection portion being connectable to the lens barrel;
    a second member that faces the first member and that is attachable to a connection portion of the lens barrel, the connection portion being connectable to the lens unit;
    a plurality of contact members that are fixed to the first member, that protrude from the first member toward the second member, and that contact the second member; and
    a plurality of adjusting/fixing members that are capable of adjusting an inclination of the first member relative to the second member and capable of fixing the first member to the second member,
    wherein the second member has an inclined surface that the contact members contact,
    wherein each of the contact members has a curved surface that contacts the inclined surface,
    wherein the number of the plurality of contact members is three,
    wherein the number of the plurality of adjusting/fixing members is three,
    wherein the adjusting/fixing members are screws,
    wherein each of the screws is disposed outside in a radial direction relative to a corresponding one of the three contact members facing the inclined surface, and
    wherein each of the three screws is aligned with the corresponding one of the three contact members in the radial direction.

2. An inclination adjusting mechanism that is capable of adjusting an inclination of a lens unit relative to a lens barrel, the inclination adjusting mechanism comprising:
    a first member that is attachable to a connection portion of the lens unit, the connection portion being connectable to the lens barrel;
    a second member that faces the first member and that is attachable to a connection portion of the lens barrel, the connection portion being connectable to the lens unit;
    a plurality of contact members that are fixed to the second member, that protrude from the second member toward the first member, and that contact the first member; and
    a plurality of adjusting/fixing members that are capable of adjusting an inclination of the first member relative to the second member and capable of fixing the first member to the second member,
    wherein the first member has an inclined surface that the contact members contact,
    wherein each of the contact members has a curved surface that contacts the inclined surface,
    wherein the number of the plurality of contact members is three,
    wherein the number of the plurality of adjusting/fixing members is three,
    wherein the adjusting/fixing members are screws,
    wherein each of the screws is disposed outside in a radial direction relative to a corresponding one of the three contact members facing the inclined surface, and wherein each of the three screws is aligned with the corresponding one of the three contact members in the radial direction.

3. The inclination adjusting mechanism according to claim 1,
wherein the lens barrel has a first internal thread,
wherein the lens unit has a first external thread that is screwable into the first internal thread,
wherein the first member has a second internal thread that is screwable onto the first external thread, and the first member is attachable to and removable from the lens unit via the second internal thread, and
wherein the second member has a second external thread that is screwable into the first internal thread, and the second member is attachable to and removable from the lens barrel via the second external thread.

4. The inclination adjusting mechanism according to claim 2,
wherein the lens barrel has a first internal thread,
wherein the lens unit has a first external thread that is screwable into the first internal thread,
wherein the first member has a second internal thread that is screwable onto the first external thread, and the first member is attachable to and removable from the lens unit via the second internal thread, and
wherein the second member has a second external thread that is screwable into the first internal thread, and the second member is attachable to and removable from the lens barrel via the second external thread.

5. The inclination adjusting mechanism according to claim 1,
wherein the inclined surface that the contact members contact is a conical surface that has a vertex on a reference axis of the lens barrel or an optical axis of the lens unit or a spherical surface that has a center on the reference axis or the optical axis.

6. The inclination adjusting mechanism according to claim 2,
wherein the inclined surface that the contact members contact is a conical surface that has a vertex on a reference axis of the lens barrel or an optical axis of the lens unit or a spherical surface that has a center on the reference axis or the optical axis.

7. The inclination adjusting mechanism according to claim 3,
wherein the inclined surface that the contact members contact is a conical surface that has a vertex on a reference axis of the lens barrel or an optical axis of the lens unit or a spherical surface that has a center on the reference axis or the optical axis.

8. The inclination adjusting mechanism according to claim 4,
wherein the inclined surface that the contact members contact is a conical surface that has a vertex on a reference axis of the lens barrel or an optical axis of the lens unit or a spherical surface that has a center on the reference axis or the optical axis.

9. The inclination adjusting mechanism according to claim 1,
wherein the three contact members are disposed at regular intervals in a circumferential direction centered on a reference axis of the lens barrel or an optical axis of the lens unit.

10. The inclination adjusting mechanism according to claim 2,
wherein the three contact members are disposed at regular intervals in a circumferential direction centered on a reference axis of the lens barrel or an optical axis of the lens unit.

11. The inclination adjusting mechanism according to claim 3,
wherein the three contact members are disposed at regular intervals in a circumferential direction centered on a reference axis of the lens barrel or an optical axis of the lens unit.

12. The inclination adjusting mechanism according to claim 4,
wherein the three contact members are disposed at regular intervals in a circumferential direction centered on a reference axis of the lens barrel or an optical axis of the lens unit.

13. The inclination adjusting mechanism according to claim 5,
wherein the three contact members are disposed at regular intervals in a circumferential direction centered on a reference axis of the lens barrel or an optical axis of the lens unit.

14. The inclination adjusting mechanism according to claim 6,
wherein the three contact members are disposed at regular intervals in a circumferential direction centered on a reference axis of the lens barrel or an optical axis of the lens unit.

15. The inclination adjusting mechanism according to claim 7,
wherein the three contact members are disposed at regular intervals in a circumferential direction centered on a reference axis of the lens barrel or an optical axis of the lens unit.

16. The inclination adjusting mechanism according to claim 8,
wherein the three contact members are disposed at regular intervals in a circumferential direction centered on a reference axis of the lens barrel or an optical axis of the lens unit.

17. The inclination adjusting mechanism according to claim 9,
wherein the three adjusting/fixing members are disposed at regular intervals in a circumferential direction centered on the reference axis of the lens barrel or the optical axis of the lens unit.

18. The inclination adjusting mechanism according to claim 1,
wherein the first member has through-holes into which the adjusting/fixing members are inserted,
wherein the second member has internal threads in portions thereof corresponding to the through-holes of the first member, the internal threads allowing the adjusting/fixing members to be screwed thereinto, and
wherein each of the screws has an outside diameter smaller than an inside diameter of a corresponding one of the through-holes of the first member and that are screwable into the internal threads.

19. An inclination adjusting mechanism comprising:
a first member;
a second member that faces the first member;
a plurality of contact members that are fixed to one of the first and second members, that protrude from the one of the first and second members toward the other of the first and second members, and that contact the other of the first and second members; and a plurality of adjusting/fixing members that are capable of adjusting an inclination of the one of the first and second members relative to the other of the first and second members and capable of fixing the one of the first and second members to the other of the first and second members, wherein the other of the first and second members has an inclined surface that the contact members contact, wherein each of the contact members has a curved surface that contacts the inclined surface, wherein the number of the plurality of contact members is three, wherein the number of the plurality of adjusting/fixing members is three, wherein the adjusting/fixing members are screws, wherein each of the screws is disposed outside in a radial direction relative to a corresponding one of the three contact members facing the inclined surface, and wherein each of the three screws is aligned with the corresponding one of the three contact members in the radial direction.

* * * * *